July 9, 1957
D. E. HALE
2,798,448
COUPLING APPARATUS
Filed June 14, 1954
3 Sheets-Sheet 1
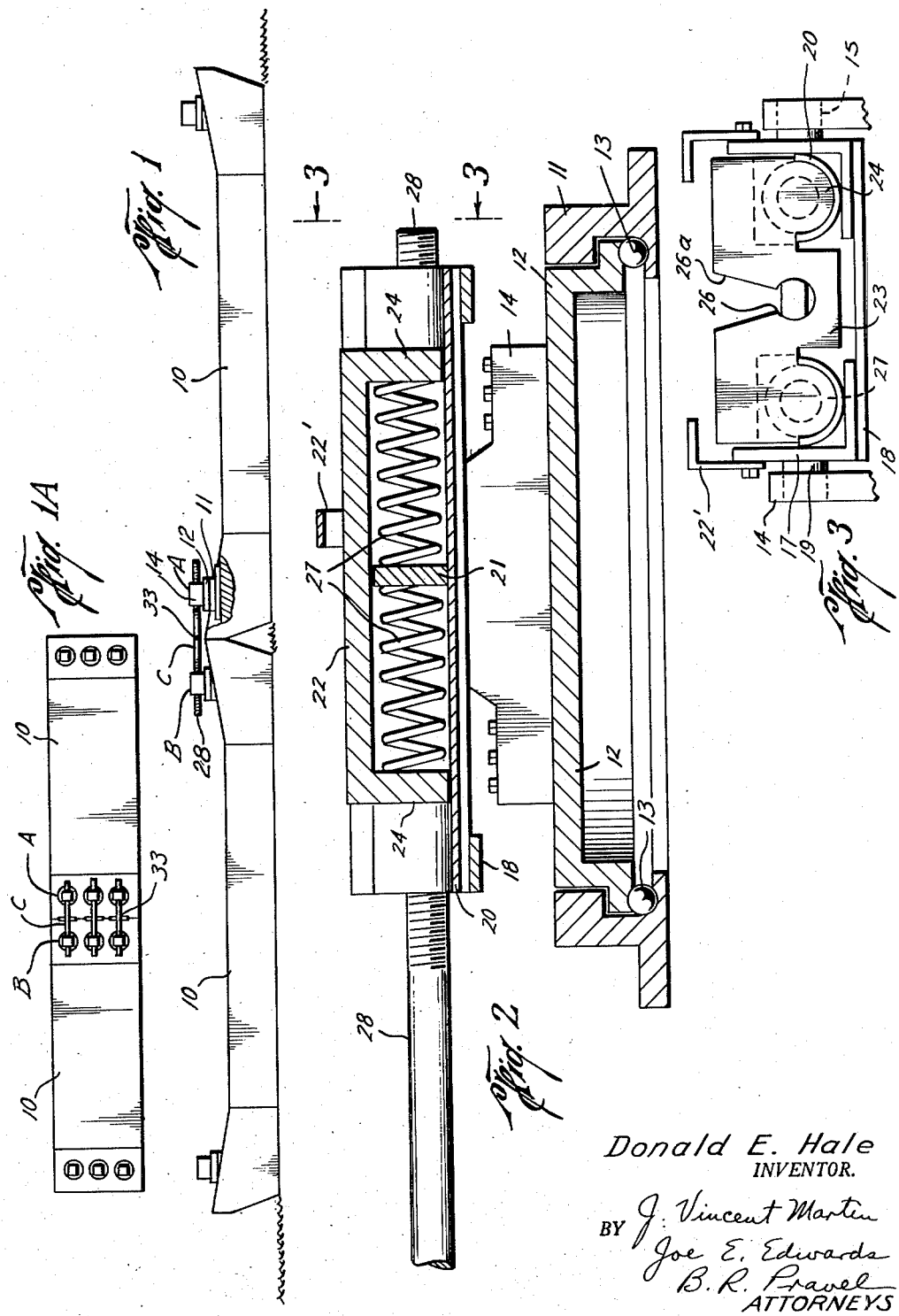
Donald E. Hale
INVENTOR.
BY J. Vincent Martin
Joe E. Edwards
B. R. Pravel
ATTORNEYS July 9, 1957 D. E. HALE 2,798,448
COUPLING APPARATUS
Filed June 14, 1954 3 Sheets-Sheet 2
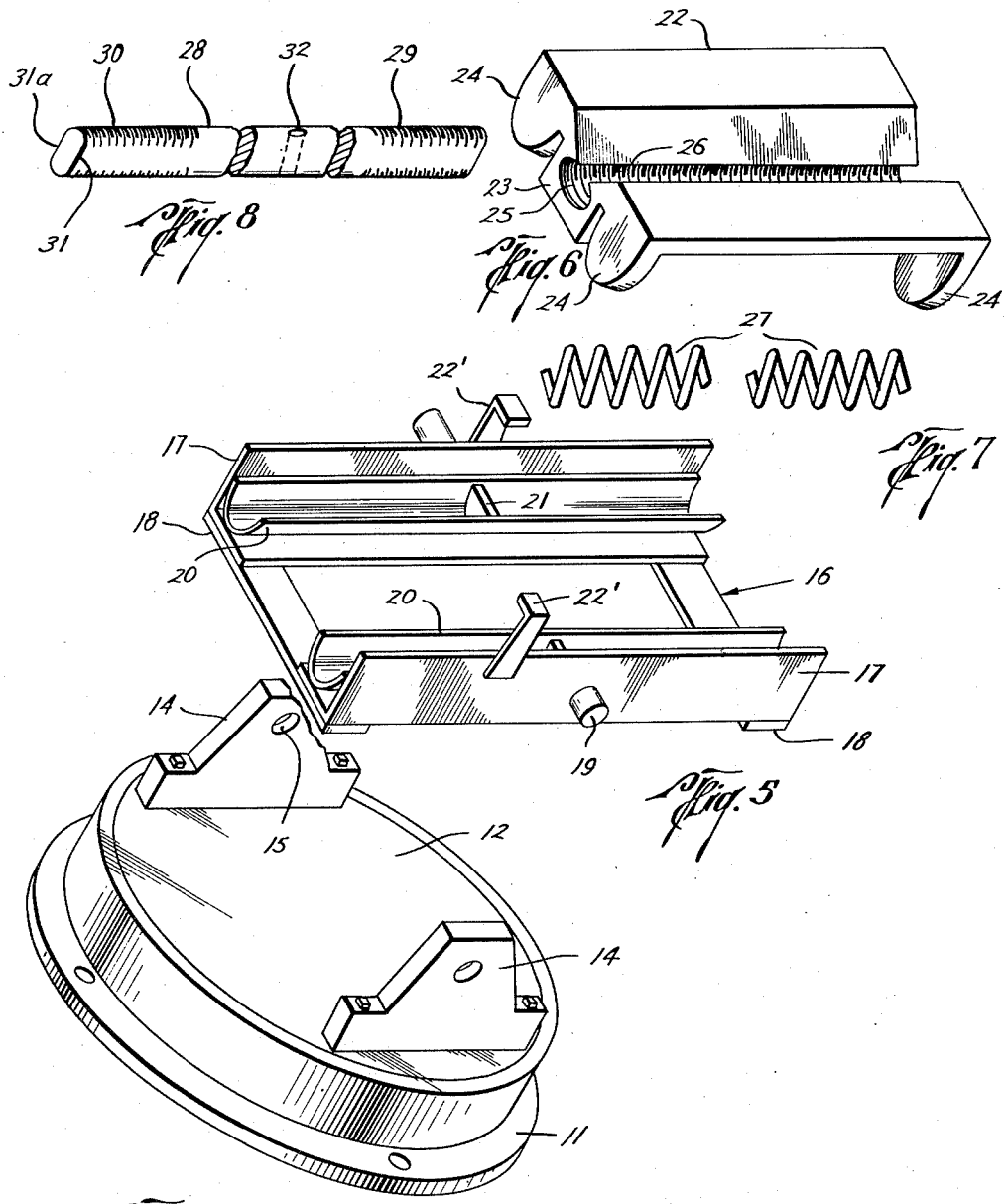
Donald E. Hale
INVENTOR.
BY J. Vincent Martin
Joe E. Edwards
B. R. Pravel
ATTORNEYS

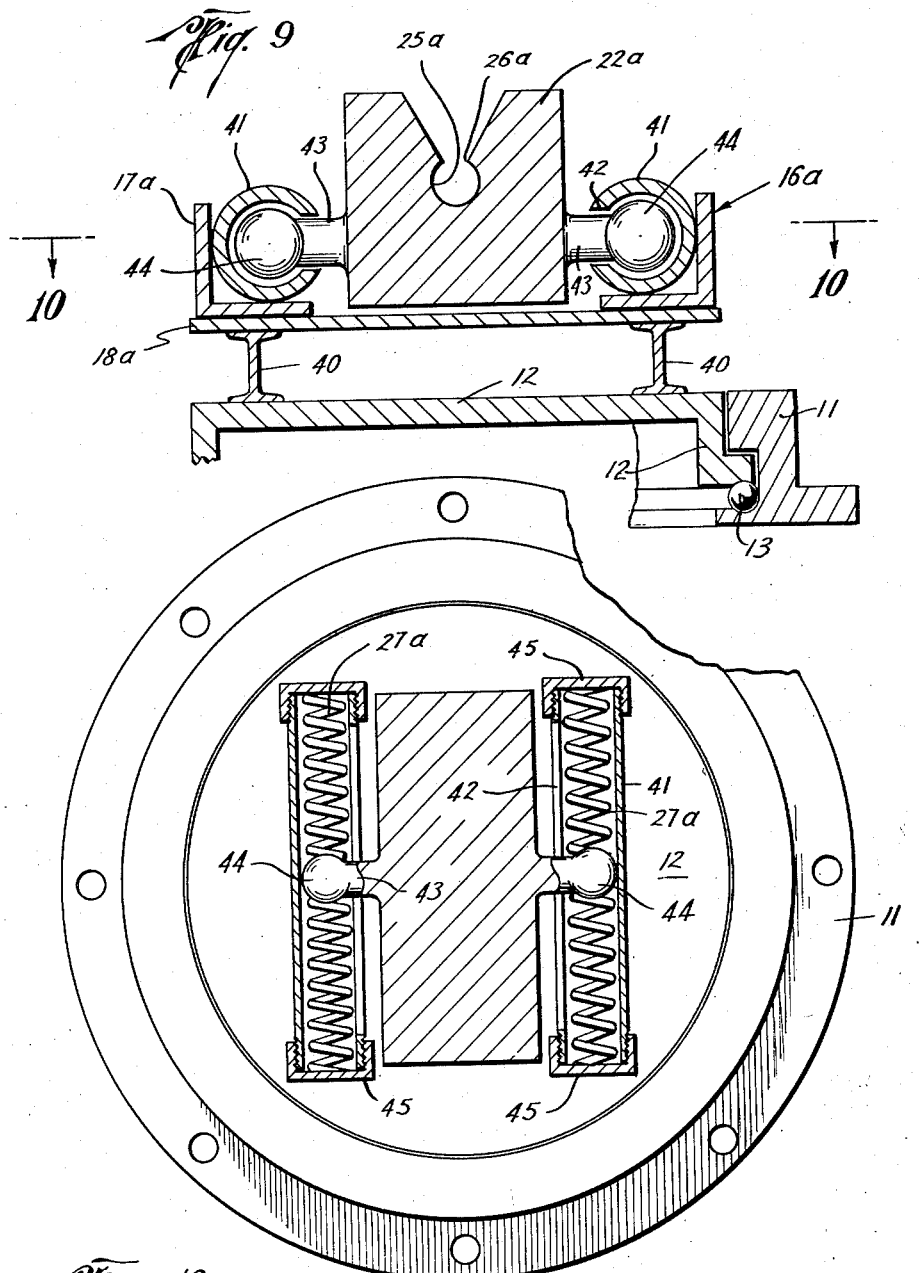

United States Patent Office 2,798,448
Patented July 9, 1957

2,798,448
COUPLING APPARATUS
Donald E. Hale, Groves, Tex.

Application June 14, 1954, Serial No. 436,558

13 Claims. (Cl. 114—235)

This invention relates to new and useful improvements in coupling apparatus.

One object of the invention is to provide an improved coupling apparatus which is particularly adapted for use in coupling barges or the like, said apparatus being applicable to any type barge or similar vessel and functioning to efficiently connect the barges in a manner which imparts to a complete tow of barges the same towing, maneuvering and handling characteristics as a single unit.

A important object of the invention is to provide an improved barge coupling apparatus wherein a rigid connecting bar may be employed in lieu of the usual flexible line or cable, said bar having each end connected with an assembly mounted on the adjacent coupled barges, which assemblies permit limited movement of each end of the bar relative to the opposite end to allow independent movement of one barge relative to the other, whereby a semi-rigid connection between the barges is produced and the inherent disadvantages of flexible lines or cables are obviated.

Another object is to provide a coupling apparatus including a base assembly on each barge, together with a rod element adapted to connect the assemblies to each other whereby the barges are coupled, the rod element and each base assembly having an improved connecting arrangement which permits quick connection or disconnection of the parts without the necessity of special tools or the like, whereby coupling and uncoupling of the barges is facilitated.

Still another object is to provide an improved base assembly for a coupling apparatus which may be readily mounted on the barge or vessel to be coupled and which includes a rotatable base member having a connecting block pivotally mounted thereon, with said block being arranged to be attached to a connecting rod, the rotatable base providing adjustability to facilitate connection between barges having the connection assemblies out of alignment and the pivotal mounting of the block compensating for vertical movement of the coupled barges with respect to each other.

A particular object is to provide a coupling apparatus, of the character described, having means for permitting limited movement or shifting of the connecting members of the apparatus in a horizontal plane, which movement may be caused by forward or rearward accelerations of the coupled barges or vessels, the shifting movement being controlled in a manner to eliminate undue jar or shock, whereby a shock-absorbing effect is had to prevent damage to the coupling.

A further object is to provide a base assembly of the character described, wherein a resilient means such as springs is employed to normally maintain the connecting block of the assembly in centered position, but which functions as a shock-absorbing means to absorb lateral shock which may be imparted to the block in a substantially horizontal plane parallel to the upper surface of said block.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Figure 1 is a side elevation of adjacent barges illustrating the same coupled by means of the improved coupling apparatus constructed in accordance with the invention;

Figure 1A is a reduced plan view of said barges;

Figure 2 is a longitudinal sectional view of one of the base assemblies to which the connecting rod is attached;

Figure 3 is a partial end elevation of the device with the lower portion of the assembly omitted;

Figure 4 is an isometric view of the base section of one of the assemblies;

Figure 5 is an isometric view of the carrier which mounts upon the base section;

Figure 6 is an isometric view of the connecting block;

Figure 7 is a view of the springs which mount between the carrier and the block;

Figure 8 is an isometric view of the connecting rod;

Figure 9 is a partial transverse sectional view of a modified form of the invention with the lower portion thereof omitted; and Figure 10 is a horizontal cross-sectional view taken on the line 10—10 of Figure 9.

In the drawings, the numeral 10 designates a barge or vessel such as is normally employed for transporting equipment and products over waterways. Two of such barges are illustrated in Figure 1, and it is usual practice to couple a number of the barges to each other to form a barge train, and said train is normally either towed or pushed by a suitable power boat. The present invention relates to an improved coupling apparatus for connecting adjacent barges, bow to stern, together. The apparatus includes a base assembly A which is shown as mounted on the stern of one barge, a second base assembly B which is shown as mounted on the bow of the adjacent barge and a connecting bar or rod 28 which secures the base assemblies and, therefore, the barges together. It is usually desirable to mount more than one coupling apparatus on each barge, and, as shown in Figure 1A, three units are provided; however, in some instances one unit may be sufficient, and, therefore, the number employed will depend upon the width of the barges and other circumstances.

The base assemblies A and B are of identical construction, and one of the assemblies is clearly illustrated in Figures 2 to 8. Each assembly comprises a flanged supporting ring 11 which is bolted or otherwise secured to the deck of the barge; where the barge deck is inclined, it is desirable to insert a leveling block or other member 12 (Figure 1) in order that the supporting ring 11 may be disposed in a horizontal plane. A generally circular base plate 12 is mounted to rotate within the supporting ring 11 upon suitable bearings 13, and diametrically opposed supporting members 14 are secured to and extend upwardly from said plate. Each supporting member has an opening 15 extending therethrough in a horizontal plane.

Pivotally mounted between the supporting members 14 is a carriage 16, which is clearly shown in Figure 5. The carriage is constructed of spaced angle bars 17 connected at their ends by straps 18 to form a generally rectangular shaped carriage. Pivot studs 19 extend outwardly from the central portions of the angle bars 17 and engage within the openings 15 of the supporting members 14, whereby the carriage is pivotally supported upon the rotatable base plate. Adjacent the inner surface of each angle bar 17 is a semi-circular saddle element 20, which may be formed by a half section of circular pipe. Each saddle element 20 extends substantially the length of the angle member to which it is attached and has a central partition or plate 21 welded therein, said plate dividing the interior of the element into two sections.

A connecting block 22, which is substantially rectangular in plan, is adapted to overlie the carriage 16, and the block has a central depending portion 23 which extends longitudinally thereof. At the corners of the block generally semi-circular end plates 24 are formed, and these end plates or lugs are adapted to fit within the semi-circular saddle elements 20 (Figure 3) which disposes the depending portion 23 between said saddle elements. A threaded bore 25 extends longitudinally of the portion 23 at the central portion of the connecting block, and the upper end of this bore is open as indicated at 26, the opening forming a longitudinal slot. The walls 26a extending downwardly from the top of the block to the opening 26 are inclined to form guide surfaces which terminate at the threaded bore 25.

When the connecting block 22 is placed in position upon the carrier 16, the end plates or lugs 24 engage within the end portions of the saddle elements 20, and between each saddle element and the intermediate dividing plate 21, which is disposed within each saddle element, a coil spring 27 is mounted. Four of the springs 27 are employed and are of substantially the same strength, so that said springs function to center the connecting block 22 with respect to the carrier 16. Upward displacement of block 22 from the carriage is prevented by retaining angles 22'. It is evident that, when the block is mounted upon the carrier, said block may undergo a pivotal movement upon the axis of the pivot studs 19; also, the block may undergo a limited lateral movement as controlled by the resilient springs 27; in addition, the block is carried by the rotatable base plate 12 and may, therefore, undergo a rotative movement upon the axis of said plate.

With each base assembly secured to its respective barge, as illustrated in Figure 1, a connecting bar or rod 28 (Figure 8) is arranged to be fastened to each connecting block. The connecting bar is provided with threads 29 for connection with the assembly A and with similar threads 30 for connection with the assembly B. As is clearly shown in Figure 8, the bar has portions removed to provide flat surfaces 31 and 31a, and the transverse distance between these surfaces is less than the diameter of the rod. The transverse distance between surfaces 31 and 31a is also less than the slot or opening 26 which communicates with the threaded bore 25 of each connecting block 22. Thus, to make up the connection of the bar or rod 28 with the respective blocks 22, it is only necessary to insert the ends of the rod into the bores 25 by moving the rod downwardly through the slots 26. Thereafter, a one-quarter turn or rotation of the rod will cause the threads 29 and 30 to engage the threaded bores 25 of the connecting blocks 22, and thus a firm connection between the blocks is obtained. In order to prevent accidental rotation of the rod after it is in connecting position, said rod may be formed with a transverse opening 32, which will be in a horizontal plane when the rod is in connecting position. A small bar 33 (Figures 1 and 2) may be inserted through the opening 32 and will overlie the decks of the barge to prevent accidental rotation of the connecting rod.

From the foregoing it will be seen that a simple and efficient coupling apparatus is provided. The connecting rod 28 may be quickly and easily dropped into position and then given a one-quarter turn to lock the two connecting blocks of the assemblies to each other. Since each connecting block is rotatably mounted by means of the base plate 12, an accurate alignment of the threaded bores 25 of the blocks may be accomplished. After the assemblies are connected by the rod 28, a vertical movement of one barge with respect to the other is permissible within the limits of the pivotable mounting of the carriage 16. The degree of pivotable movement is arranged to take care of the normal motions of the barges with relation to each other. The springs 27 mount each connecting block resiliently with respect to the carriage 16, and normally these springs maintain the block in centered position. Any impact or jar in a horizontal plane which may be occasioned by acceleration or deceleration of the barges or which may be produced from other causes is absorbed by the springs, which will permit limited controlled movement between the connecting block 22 and its carriage. The apparatus is relatively simple in construction and may be made very sturdy and rugged to withstand hard usage.

In Figures 9 and 10 a modification of the form of the invention is illustrated. In this modification the support ring 11 and the base plate 12 are employed. However, instead of mounting the carrier by means of the pivot studs 19, a carrier 16a is supported upon I-beams 40, which are suitably secured to the upper surface of the base plate. The carrier 16a comprises angle bars 17a connected by straps 18a. In place of the saddle elements 20, cylindrical pipes 41 are secured to the inner sides of the angle members 17a, and each pipe 41 is provided with a longitudinal slot 42. As shown in Figure 9 the slots 42 are directed inwardly. A carrier block 22a is provided with a threaded bore 25a and with an entry slot 26a in a manner similar to the bore 25 and slot 26 of the block 22.

The block 22a is disposed between the pipes 41, and said block has studs or pivot pins 43 extending from each side thereof. Each stud or pivot pin extends through the adjacent slot 42 of one of the pipe members and has an enlarged retaining element 44, which may be in the form of a ball, on its outer end. The retaining ball 44 is located within the interior of the pipe 41, and it will be obvious that the block 22a is thereby pivotally mounted with respect to the carrier 16a.

The studs or pivot pins 43 and retaining balls 44 extend outwardly from opposite sides of the block 22a and are disposed at substantially the central portion thereof (Figure 10), whereby the retaining balls 44 are located at substantially the center or mid-portion of each pipe 41. Coil springs 27a are confined between each ball member 44 and end caps 45, which are threaded or otherwise secured to the ends of the pipes 41. The operation of the form of the invention illustrated in Figures 9 and 10 is the same as heretofore described with respect to the form illustrated in Figures 1 to 8. The assemblies on adjacent barges are connected together by means of the connecting rod 28, the ends of the rod being engaged within the bores 25a of the block 22a. It is apparent that block 22a may undergo pivotal movement with respect to the carrier and base plate by reason of the pins 43 being engaged within slots 42. Also, the block may undergo a controlled lateral movement with respect to the carrier 16a by reason of the resiliency of the springs 27a. The entire assembly is, of course, rotatable since it is carried by the rotatable base plate 12.

As has been noted, the springs 27 and the springs 27a mount the connecting block for limited movement in a plane parallel to the upper surface of the carrier and function as a shock-absorbing means. Although springs have been found satisfactory to normally maintain the block in proper position while still permitting limited controlled movement, it is apparent that other equivalent shock-absorbing means may be employed; for example, an hydraulic shock-absorbing means could be substituted for the springs. Such a fluid-actuating means would normally maintain the block in its proper position, but, upon sudden impact or jar, would permit movement in a lateral more horizontal plane.

The provision of the connecting rod 28, together with the construction of the co-acting assembly, provides for ease of operation. The barges may be moved into an abutting position, and the rod may be quickly and easily dropped into place and then rotated a one-quarter turn to complete the coupling operation. The coupling is semi-rigid, but permits some vertical movement of the barges with respect to each other, this movement being accomplished by the pivotal mounting of the block with respect to the base. The springs provide further resiliency in mounting and allow some motion in a lateral or horizontal plane, said springs also functioning as shock absorbers to eliminate excessive impact or jar upon the coupling. It has been found that extremely close coupling of barges can be easily effected, whereby a barge train may be towed, maneuvered or handled as easily as a single unit.

The foregoing disclosure and description of the invention is illustrative and explanatory thereof, and various changes in the size, shape and materials, as well as in the details of the illustrated construction, may be made within the scope of the appended claims without departing from the spirit of the invention.

What is claimed is:

1. A coupling apparatus including, a pair of base assemblies mounted to rotate on vertical axes on the adjacent units which are to be coupled, each assembly having a connecting block pivotally mounted on a horizontal axis, and a connecting bar extending between the assemblies and having its ends detachably connected with said blocks.

2. In combination with a pair of barge units to be coupled, a coupling apparatus comprising, a first base assembly mounted on one barge unit, a second base assembly mounted on the adjacent barge unit, a rod extending between the assemblies, each base assembly including a carriage mounted for pivotal movement on a horizontal axis, a connecting block having limited lateral movement relative to the carriage and also having a threaded bore extending longitudinally therethrough, and threads on each end of the connecting rod for engagement with the threaded bores of the blocks of said assemblies, whereby the rod couples the assemblies together.

3. A coupling apparatus as set forth in claim 2, together with resilient means confined within the carriage and acting upon the block for resiliently mounting each connecting block for limited lateral movement with respect to the base assembly of which it forms a part.

4. A coupling apparatus comprising, a first base assembly mounted on a barge unit, a second base assembly mounted on an adjacent barge unit, a rod extending between the base assemblies, each base assembly including a part having a longitudinally extending threaded bore, said bore having a longitudinal entrance slot of a width which is less than the diameter of the bore, said connecting rod having its ends threaded for engagement with the threaded bores of the parts of the respective assemblies, the rod also having flattened side portions with the transverse width of the rod between said flattened portions being less than the width of the entrance slot to each threaded bore, whereby the rod may be inserted within each bore through said slot and thereafter rotated to engage the threads of the rod with the threads of said bore.

5. A coupling apparatus as set forth in claim 4, together with means mounting that part of each assembly which has the threaded bore therein for pivotal movement on a horizontal axis.

6. A coupling apparatus as set forth in claim 4, together with means mounting that part of each assembly which has the threaded bore therein for pivotal movement on a horizontal axis, and additional means mounting said part for limited lateral movement with respect to the assembly.

7. In a coupling apparatus, a base assembly including, a base plate, a carriage mounted directly on said base plate, a connecting block supported by the carriage and mounted for limited sliding movement relative to the carriage, said block having pivotal movement on a horizontal axis with respect to the base plate, and means on said block for detachably connecting a connecting element thereto.

8. A base assembly as set forth in claim 7, together with resilient means normally resisting the lateral movement of the block with respect to the carriage.

9. A base assembly as set forth in claim 7, together with means mounting the base plate for rotation on a vertical axis.

10. A base assembly as set forth in claim 7, wherein the carriage is pivoted upon the base plate for swinging movement on a horizontal axis and wherein the block directly overlies and is mounted upon said carriage.

11. A base assembly as set forth in claim 7, wherein the carriage is secured to the base plate and also wherein the connecting block is pivoted to the carriage for movement about a horizontal axis.

12. In a coupling apparatus, a base assembly including, a base plate, a carriage mounted directly upon and secured to the base plate, a pair of tubular supporting elements mounted in spaced parallel relationship on said carriage, a block member located between the tubular elements, each tubular element having a longitudinal slot in its inner portion which is adjacent the block member, supporting means extending outwardly from each side of the block member and projecting through the slots of the tubular elements whereby the block member is supported for longitudinal movement as well as pivotal movement on a horizontal axis with respect to the tubular elements, and means on said block for detachably connecting a connecting element thereto.

13. In a coupling apparatus, a base assembly as set forth in claim 12, together with spring means confined within each tubular element and engageable with the supporting means of the block member to resist longitudinal movement of the block member with respect to the tubular elements.

References Cited in the file of this patent

UNITED STATES PATENTS

| | | |
|---|---|---|
| 1,014,313 | Maclind | Jan. 9, 1912 |
| 1,530,395 | Muller | Mar. 17, 1925 |
| 2,121,416 | White | June 21, 1938 |
| 2,238,095 | Almcrantz | Apr. 15, 1941 |
| 2,552,885 | Claud-Mantle | May 15, 1951 |